July 28, 1959 N. D. LARKY 2,897,260

COLOR TELEVISION

Filed July 28, 1954 2 Sheets-Sheet 1

INVENTOR.
NORBERT D. LARKY
BY
ATTORNEY

July 28, 1959 N. D. LARKY 2,897,260

COLOR TELEVISION

Filed July 28, 1954 2 Sheets-Sheet 2

INVENTOR.
NORBERT D. LARKY
BY
ATTORNEY

United States Patent Office 2,897,260

Patented July 28, 1959

2,897,260

COLOR TELEVISION

Norbert D. Larky, Somerville, N.J., assignor to Radio Corporation of America, a corporation of Delaware Application July 28, 1954, Serial No. 446,321

3 Claims. (Cl. 178—5.4)

The present invention relates to synchronizing and time multiplexing circuits, and more particularly to synchronizing and time multiplexing circuits of the type employed in color television receivers.

Color television provides the reproduction on the viewing screen of the receiver of not only the relative luminescence and brightness but also the color hue and saturation describing the color details in the original scene. The electrical transfer of the color images is accomplished by additive methods. Additive methods produce natural color images by breaking down the light from an object into a predetermined number of selected primary or component colors. Component colors may then be transferred electrically by analyzing the light from an object into not only its image elements as is accomplished by normal scanning procedure, but also by analyzing the light from elemental areas of the image into selected primary or component colors and deriving therefrom a signal representative of each of the selected color components. The color image may then be reproduced at a remote point by appropriate reconstruction from a color signal.

In order that the reproduction of a color image may be achieved with suitable fidelity in a receiver which is adapted to receive color television signals and perform the functions of the reconstruction of the color image on an appropriate color image reproducer, it is important that complete cooperation between the transmitter and the receiver be accomplished. As a result much emphasis is placed on the development and utilization of synchronizing methods in color television wherein it is necessary to not only maintain accurate deflection scanning, but also it is necessary to provide accurate synchronism in the timing of the color signal selection.

In order that the need for color sync signal synchronization of extreme accuracy might be appreciated, consider first the nature of the color television signal which conveys both the monochrome and color image to the receiving apparatus. It is to be understood that the color image information is accompanied by a sound modulated subcarrier which conveys the sound information; this sound subcarrier is located in the transmitted signal spectrum at a postion 4½ mc. from the carrier signal of the transmitted video information.

The color television picture is resolved into a set of four different types of signals. One of these component signals is the synchronizing signal which synchronizes the deflection circuits of the receiver with the information which is being transmitted.

The second component signal is termed the luminance or monochrome information. This information corresponds to the information which is normally transmitted for a monochrome image in black-and-white television signal transmission. When considered in terms of its use in the transmission of color television information, it is important to realze that the luminance or monochrome signal is actually formed by the combination of three primary color signals.

The additional signals required to produce a color picture are the chrominance signals and the color synchronizing signals. Consider first the nature of the chrominance signal. The monochrome or luminance signal already contains predetermined amounts of component color signals, namely the Y signal which is made up of 59% green, 30% red and 11% blue; it then follows that if it is desired that red, green, and blue signals be color difference signals of the type $R-Y$, $G-Y$, and $B-Y$ will indicate how each color in the televised scene differs from a monochrome version of the color of the same luminance.

The manner of transmitting the chrominance information is one involving the use of a unique type of color subcarrier. This color subcarrier has a frequency of approximately 3.58 mc. and contains color information through the entire gamut of the useable color range including the previously mentioned $R-G$, $G-Y$ and $B-Y$ color-difference information. All of the component hue signals which are included in the modulated color subcarrier will be identified by component signals of a particular phase. The saturation associated with a particular hue will be associated with the amplitude of the component signal having the phase prescribed by the hue. At the receiver the signal information relating to any desired hue may be recovered by employing the processes of synchronous detection; that is by heterodyning the modulated color subcarrier by a locally generated heterodyning signal having the frequency of the color subcarrier but having the phase associated with the particular hue being demodulated. If a multiplicity of hues are required for demodulation at the receiver, it follows then that a corresponding set of heteroyning signals must be provided each having the frequency of the modulated color subcarrier and the phase of the corresponding hue.

The color television signal, which represents both signals relating to the monochrome information and the color television signal which includes both hue and saturation information is then transmitted to the color television receiver. It follows from the preceding paragraph that if the processes of synchronous detection are to be employed, then means must be provided for accurately synchronizing the phases of locally generated heterodyning or synchronous detection signals with the color information which is being sent at the transmitter. This is uniquely accomplished by including a color synchronizing burst of approximately 8 cycles of the color subcarrier frequency on the back porch of the horizontal synchronizing pulse. The phase of the burst bears a predetermined phase relationship with each of the many hues which are included in the modulated color subcarrier.

In order for the color synchronizing burst to be used to provide synchronous detection signals having accurately controlled phases in the color television receiver, it is evident that frequency and phase synchronizing circuits having unusual characteristics both from the standpoint of accuracy and also the ability to achieve synchronism with a color synchronizing burst of very short duration must be employed in the color television receiver. It is to provide new and improved methods of achieving color synchronizing burst responsive local oscillator synchronization in a receiver that the present invention is dedicated.

In many modern receiver oscillators which produce the color synchronizing burst synchronized local signal, it is often desirable to include such features as burst separation and bust multiplexing; in addition, such circuits are required to have low phase drift and high noise immunity. The teachings of the invention to be described permit performance of the functions of burst synchronization, and bust multiplexing, under conditions of low phase drift and high noise immunity, in a simple and novel fashion.

It is, therefore, an object of this invention to provide a synchronized oscillator which has low phase drift and high noise immunity.

It is still another object of the invention to provide a burst synchronized oscillator utilizing a piezo-electric crystal for filtering the synchronizing burst. The piezo-electric crystal is used in a manner whereby it presents minimum series reactance at the burst frequency.

It is yet another object of the present invention to provide a piezo-electric crystal burst synchronized oscillator wherein the synchronizing burst is filtered through the crystal with low attenuation.

It is still a further object of this invention to provide noise immunity in a piezo-electric crystal burst-synchronized oscillator which includes the function of burst multiplexing.

It is still another object of this invention to provide a piezo-electric crystal burst synchronized oscillator wherein no tuned reactances or resonant circuits are required other than the piezo-electric crystal which operates as a non-reactance element.

It is still a further object of this invention to provide a piezo-electric crystal burst-synchronized oscillator wherein the piezo-electric crystal operates as a non-reactance element and wherein a diminution of the strength of oscillation is effected at burst time so as to facilitate synchronization.

According to one form of the invention, a piezo-electric crystal is coupled between appropriate grids of each of a pair of multielectrode electron tubes. In this circuit the piezo-electric crystal is operated as a series resonant circuit and the 360° phase shift required for oscillation is obtained by using the 180° phase shift through each of the pair of tubes. Since the piezo-electric crystal is operated at series resonance at the burst frequency, the burst may be filtered through the crystal with minimum attenuation. The chrominance information and a kickback pulse are fed to a second control grid of one of the two tubes utilized. The action of the kickback pulse multiplexes the color synchronizing burst through the piezo-electric crystal wherein it is filtered and then to an appropriate control grid to perform the functions of phase synchronization. In addition, due to the action of the kickback pulse, a diminution of the strength of oscillation is effected during the burst interval so as to facilitate burst synchronization.

All and incidental objects of this invention will become apparent upon a reading of the following specification and an inspection of the drawings in which.

Figure 3:
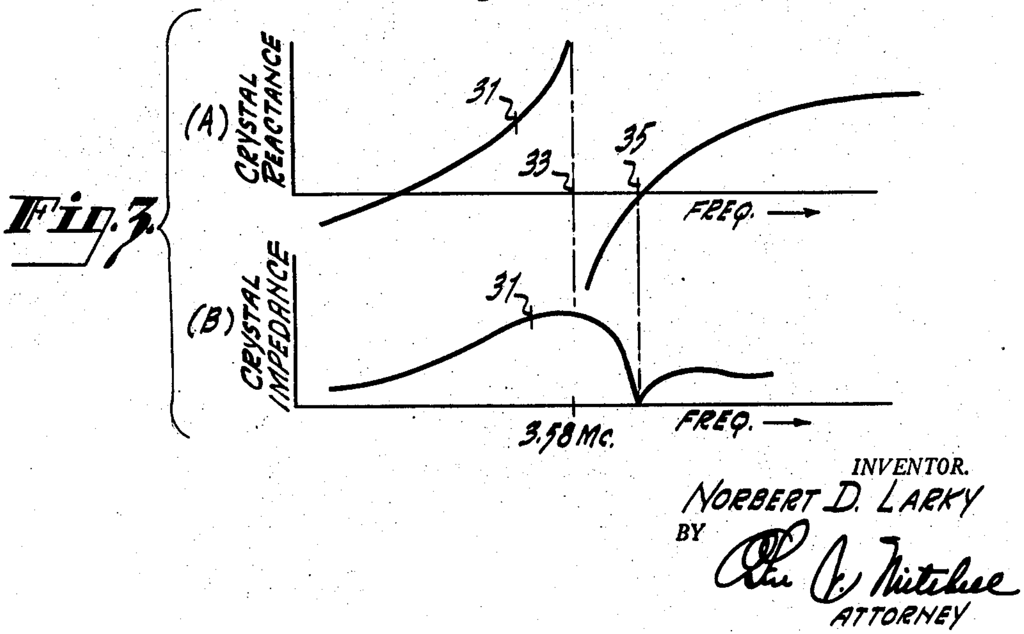
Figure 4:
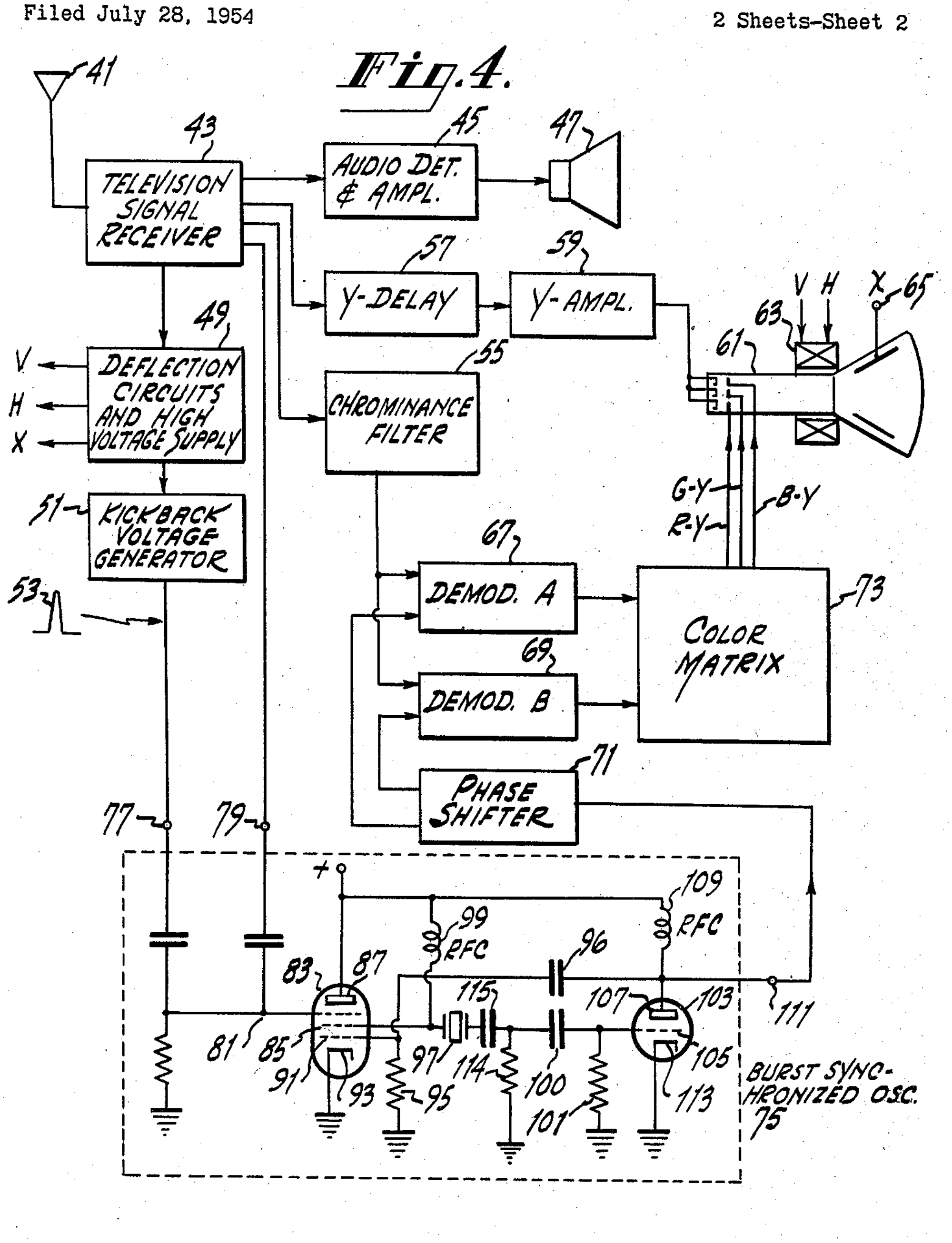

Figure 3*a* shows a portion of a typical curve of crystal reactance versus frequency;

Figure 3*b* shows a portion of a typical curve of crystal impedance versus frequency; and Figure 4 shows a block diagram of a color television receiver in which has been included the schematic diagram of one embodiment of a burst synchronized piezo-electric crystal oscillator which performs according to the teachings of the present invention.

Figure 1:
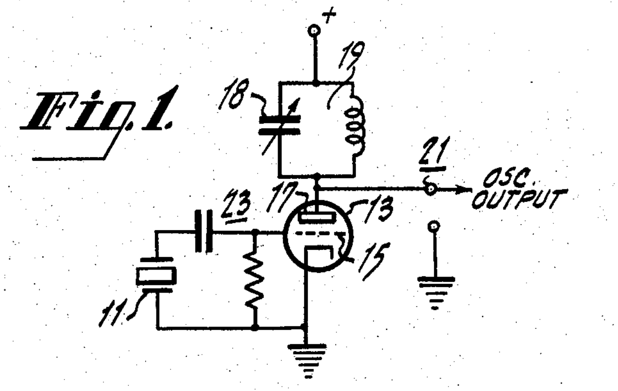
Figure 1 shows a circuit diagram of a simple piezo-electric crystal oscillator.

Before entering upon a discussion of the teachings of the present invention and circuits which can operate according to these teachings, consider, for example, the operation of the simple piezo-electric crystal oscillator shown in Figure 1. The operation of such oscillators is very well known and is discussed at length in such publications as, for example, chapter 4 of the "Principles of Radar," by Reintjes and Coate, as published by the McGraw-Hill Book Company in 1952. In such a circuit the piezo-electric crystal 11 forms a resonant circuit coupled to the grid 15, and the resonant circuit 19 is coupled to the anode 17 of the tube 13. The quartz crystal is a mechanical resonant system coupled by the piezo-electric effect to the electric circuit. Feedback occurs through the grid to plate capacitance of the tube 13. The circuit oscillates only for certain tuning adjustments of the capacitance 18 and the oscillation frequency is closely controlled by the piezo-electric crystal. The tuning adjustment performed by the capacitance 18 is such that the piezo-electric crystal is operated near its parallel resonance in such a way that the piezo-electric crystal is operated as an inductance, and, for oscillations to be developed, the resonant circuit 19 must be tuned so that it is also inductive.

Figure 2:
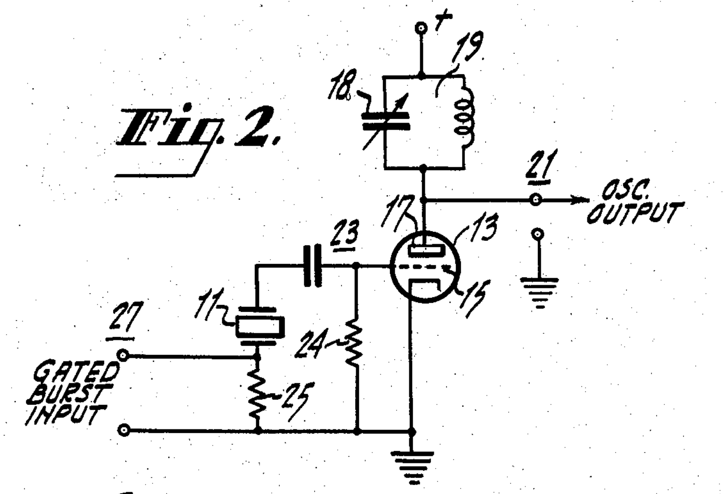
Figure 2 shows the circuit diagram of a simple burst synchronized piezo-electric crystal oscillator.

Figure 2 shows a version of the circuit shown in Figure 1 wherein a gated synchronizing burst may be applied to the input terminals 27 and developed across the resistor 25 which is in series with the piezo-electric crystal 11. The gated or separated color synchronizing burst is then filtered by the piezo-electric crystal 11 and presented across the resistance 24 of the grid-leak circuit 23 in a manner whereby the principles of phase synchronization may be brought into play and the oscillator circuit will oscillate at the frequency of the color synchronizing burst. In this circuit, the crystal again operates near its parallel resonance frequency and as an inductance. The resonant circuit 19 is not tuned to resonance, but rather is adjusted to act as an inductance. The burst is fed in such a manner that it must travel through the crystal 11 in order to reach the control grid 15 and at that point perform the synchronizing function. This is a desirable result; however, in order to pass through the piezo-electric crystal 11, which is near parallel resonance at the burst frequency, but operating as an inductance, the color synchronizing burst must suffer undesirable attenuation.

The attenuation experienced by the filtering action of the piezo-electric crystal 11 in the circuit in Figure 2 on the color synchronizing burst is best illustrated by the portions of typical curves for crystal reactance and crystal impedance as a function of frequency as shown in Figures 3*a* and 3*b*, respectively.

As is shown in the curve in Figure 3*a*, if the piezo-electric crystal is tuned so as to present an inductive element at the frequency represented by, for example, the designator 31, it is seen that with regard to passing the burst in series to the crystal, considerable attenuation of the burst will occur. However, if the piezo-electric crystal is utilized as a series path to the color synchronizing burst at the frequency represented by the designator 35 which represents the region of minimum attenuation by the piezo-electric crystal, it then follows that the color synchronizing burst will experience low attenuation and a stronger synchronizing voltage will be produced in a manner which will render the oscillator circuit, which is responsive to the piezo-electric crystal, relatively noise immune. The following, then, presents one embodiment of a piezo-electric crystal oscillator circuit which permits the operation of a piezo-electric crystal in a manner wherein it operates as a non-attenuating element and also whereby it is not necessary that the piezo-electric crystal be tuned to be inductive in order for oscillations to occur.

The burst synchronized oscillator 75 which functions according to the teachings of the present invention is shown in Figure 4. Here, the incoming color television signal reaches the antenna 41 and is applied to the television signal receiver 43. The television signal receiver 43 performs the functions of first detection, intermediate frequency amplification, and second detection in a manner described, for example, by Antony Wright in his paper entitled, "Television Receivers" as published in the March 1947 issue of the RCA Review.

The output of the television signal receiver 43 is then the recovered color television signal information which also includes the sound which has been transmitted on a frequency modulated carrier 4½ mcs. removed from the video carrier.

Utilizing the audio detector and amplifier 45 in a manner which employs, for example, the well known principles of intercarrier sound, the sound information may be detected and amplified and applied to the loud speaker 47.

The color television signal emanating from the color television receiver 43 is also applied to the deflection circuits and high voltage supply 49, which supplies deflection signals to the yokes 63, a high voltage to the ultor 65, and activation for the kickback voltage generator 51 which produces the gate voltage 53 which has a duration interval during the blanking period. The gate voltage 53 is adjusted to have the duration interval of the color synchronizing burst and when this gate voltage is applied to the terminal 77 in addition to the color television signal being applied to the terminal 79 of the burst synchronized oscillator 75, an oscillator signal is produced at the output terminal 111; this oscillator signal is in accurate phase with respect to the phase and frequency prescribed by the color synchronizing burst.

The color television signal is passed through the chrominance filter 55 and applied, for example, to the demodulator A67 and to the demodulator B69 to which are also respectively applied oscillator signals from the phase shifter 71 which is coupled to the output terminal 111 of the burst synchronized oscillator 75.

In the demodulator A67 and demodulator B69, the processes of synchronous detection are employed depending upon the precise phases of the signals supplied by the phase shifter 71. In one well known system of color television, for example, I and Q signals may be produced respectively, by the demodulator A67 and the demodulator B69. In yet another system, for example, the demodulator A67 and the demodulator B69 may be utilized to produce *R—Y* and *G—Y* color-difference signals, respectively. The outputs of demodulator A67 and the demodulator B69 are then applied to the color matrix 73 wherein, by proper combination of applied waves, in addition to filtering, delay, and D.-C. restoration, the resultant color-difference signals *R—Y, G—Y* and *B—Y* are applied at high signal level to appropriate control electrodes of the color image reproducer 61.

At the same time the luminance or Y signal which is included in the color television signal is applied to the Y delay line 57 and amplifier in the Y amplifier 59 which impresses the amplified and delayed Y information on the cathodes of the color image reproducer 61 in a manner whereby addition of the Y information and the color-difference information is performed to yield the recovered color television image on the image face of the color image reproducer 61.

Consider in detail the operation of the burst synchronized oscillator 75 shown in Figure 4. The gate pulse 53 is applied to the input terminal 77 with the color television signal applied to the input terminal 79. Both are applied to the terminal 81 which is coupled to the third grid of the electron tube 83. The polarity of the gate pulse 53 is positive and is so applied as to control the space charge distribution in the electron tube 83 so that during the duration of the color synchronizing burst, the electron flow is caused to substantially reach the anode 87, thereby multiplexing the color synchronizing burst, which occurs during the duration interval of the gate pulse 53, into the screen grid 89 of the electron tube 83.

The piezo-electric crystal 97 is coupled between the screen grid 85 of the electron tube 83, and the control grid 105 of the electron tube 103. The color synchronizing burst is then multiplexed through the choke 99 and the piezo-electric crystal 97 and is developed across the resistances 114 and 101; resistor 114 acts to terminate the piezo-electric crystal 97, while resistor 101 is chosen of the proper size to perform the function of developing bias for the oscillator. The presence of the color synchronizing burst across the resistance 101 then causes injection-lock phase synchronization of the oscillations developed in the circuit involving electron tube 83, electron tube 103 and the piezo-electric crystal 97 whose oscillation-producing characteristics will be described in the succeeding paragraph. The principles involved in the processes of injection-lock phase synchronization are explained in detail by C. L. Cuccia in chapter 12 of the book "Harmonics, Sidebands and Transients in Communication Engineering," as published by McGraw-Hill Book Co. in 1952.

In the circuit shown in the burst synchronized oscillator 75, the piezo-electric crystal is operated at series resonance. Since 360° phase shift is required for oscillation, 180° of the 360° is obtained from the control grid 105 to the anode circuit coupled to the anode 107 of the electron tube 103. This 180° phase-shifted signal is coupled through the condenser 96 to the resistor 95 and the control grid 91, which then produces a voltage at the screen grid 85 which is again 180° out of phase with respect to the voltage developed at the anode 107 of the electron tube 103, thereby causing the 360° phase shift required from one side of the piezo-electric crystal to the other.

The frequency of operation is chosen at the frequency having the designator 35 in Figure 3*a*. At this frequency the crystal reactance is zero and the attenuation afforded by the piezo-electric crystal as a series element is at a minimum; therefore, the color synchronizing burst which is multiplexed through the piezo-electric crystal 97 to be developed across the resistor 101 and to act to phase synchronize the oscillator, will experience minimum attenuation. No tuned circuits are required aside from the piezo-electric cystal 97; the chokes 99 and 109 are merely utilized to present choking elements at appropriate points of the oscillator circuit. This ability to operate without the use of auxiliary tuned or resonant circuits is derived from the fact that the piezo-electric crystal is operating as a non-reactance element.

Another function is afforded by the circuit which enhances the operation. During the duration of the gate pulse 53, at which time interval the color synchronizing burst is multiplexed through the piezo-electric crystal 97, a reduced number of electrons are allowed to reach the screen grid 85 because of the current distributive effect of the grid 85. This causes a reduction of the strength of operation during the interval of the gate pulse and thereby facilitates synchronization.

Having described the invention, what is claimed is:

1. In a color television receiver, said color television receiver adapted to receive a color television signal, said color television signal including a color synchronizing burst, said color synchronizing burst having a predetermined frequency and phase, a burst synchronized oscillator, comprising in combination, a piezo-electric crystal tuned to present a substantially non-reactive series impedance at the frequency of said color synchronizing burst, a plurality of phase shift amplifier devices, each of said phase shift amplifier devices having an input terminal and an output terminal means for incorporating said piezo-electric crystal with said plurality of phase shift amplifier devices to provide a phase shift and amplifying circuit operatively connected to said piezo-electric crystal and having the phase shift required to develop oscillation at the frequency of said color synchronizing burst, said last named means comprising means for coupling the output terminal of one of said plurality of phase shift amplifier devices to the input terminal of another of said phase shift amplifier devices and means for coupling the output terminal of said other phase shift amplifier device to the input terminal of said one phase shift amplifier device via said piezo-electric crystal, and means for injecting said color synchronizing burst into said piezo-electric crystal to filter said color synchronizing burst and injection-lock the oscillations produced in conjunction with said piezo-electric crystal at a frequency and phase prescribed by said color synchronizing burst.

2. The invention as set forth in claim 1 and wherein one of said plurality of phase shift amplifier devices is a multi-control electrode electron control device and wherein said piezo-electric crystal is coupled to one of said control electrodes and said color synchronizing burst is coupled to a second of said control electrodes.

3. In a color television receiver adapted to receive a color television signal including color synchronizing bursts of a reference frequency, said receiver including apparatus for separating said color synchronizing bursts, and self-oscillating means for generating oscillations desirably in synchronism in frequency and phase with the separated bursts, said generating means including an amplifier device having an input electrode, the improvement which comprises the combination of a piezo-electric crystal tuned for series resonance at said reference frequency, and means for utilizing said piezo-electric crystal as both the frequency determining element of said self-oscillating oscillation generating means and as a minimum impedance, narrow band, signal path for passing the separated burst output of said burst separating apparatus to said amplifier device input electrode to effect injection locking of said self-oscillating oscillation generating means thereto.

References Cited in the file of this patent

UNITED STATES PATENTS

| | | |
|---|---|---|
| 2,594,380 | Barton | Apr. 29, 1952 |
| 2,653,187 | Luck | Sept. 22, 1953 |
| 2,735,886 | Schlesinger | Feb. 21, 1956 |

OTHER REFERENCES

Design Techniques of Color Television Receiver, Electronics, February 1954, page 143.

Color TV, Rider Publication, March 1954, pages 141, 142.